United States Patent
Wang et al.

(10) Patent No.: US 10,863,555 B2
(45) Date of Patent: Dec. 8, 2020

(54) ACCESS METHOD, APPARATUS, DEVICE, AND SYSTEM

(71) Applicant: Huawei Technologies Co., Ltd., Shenzhen (CN)

(72) Inventors: Yuan Wang, Shanghai (CN); Fenqin Zhu, Shanghai (CN); Jingwang Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/148,665

(22) Filed: Oct. 1, 2018

(65) Prior Publication Data
US 2019/0110323 A1    Apr. 11, 2019

Related U.S. Application Data

(63) Continuation of application No. PCT/CN2016/078378, filed on Apr. 1, 2016.

(51) Int. Cl.
*H04W 8/04* (2009.01)
*H04W 76/10* (2018.01)

(52) U.S. Cl.
CPC ............. *H04W 76/10* (2018.02); *H04W 8/04* (2013.01)

(58) Field of Classification Search
CPC ...................................................... H04W 79/10
See application file for complete search history.

(56) References Cited

U.S. PATENT DOCUMENTS

| 2013/0094435 | A1 | 4/2013 | Deng et al. |
| 2017/0041824 | A1* | 2/2017 | Costa-Requena ....... H04L 41/12 |
| 2017/0272993 | A1* | 9/2017 | Jeong ..................... H04W 36/14 |

FOREIGN PATENT DOCUMENTS

| CN | 102348255 A | 2/2012 |
| CN | 103517256 A | 1/2014 |
| CN | 103533612 A | 1/2014 |
| EP | 3432151 A1 | 1/2019 |

(Continued)

OTHER PUBLICATIONS

"Dedicated Core Network (DCN) selection based on UE's indication to RAN," SA WG2 Meeting #111, Chengdu, P. R. china, XP051035145, S2-153596, 3rd Generation Partnership Project, Valbonne, France (Oct. 19-23, 2015).

(Continued)

*Primary Examiner* — Michael T Vu
(74) *Attorney, Agent, or Firm* — Leydig, Voit & Mayer, Ltd.

(57) ABSTRACT

The present application discloses an access method, apparatus, device, and system, and belongs to the field of communications technologies. The method includes: receiving, by a selection function entity SFE, an access request of user equipment UE sent by a radio access network node RAN node; determining a usage type of the UE based on the access request of the UE; and selecting, for the UE based on the usage type of the UE, a node that is in a dedicated core network and that can serve the UE, where the node that is in the dedicated core network and that can serve the UE corresponds to the usage type of the UE. Therefore, a node accessed by the UE is the node in the dedicated core network corresponding to the UE, and this ensures that the node can complete security verification of the UE.

17 Claims, 7 Drawing Sheets

(56) References Cited

FOREIGN PATENT DOCUMENTS

WO   2013013531  A1   1/2013
WO   2017166252  A1   10/2017

OTHER PUBLICATIONS

"Discussion on DCN selection based on Usage Type and DCN Type," 3GPP TSG SA WG2 Meeting #113, Frigate Bay Saint Kitts and Nevis, KN, XP051072185, S2-160308, 3rd Generation Partnership Project, Valbonne, France (Jan. 25-29, 2016).

"3rd Generation Partnership Project;Technical Specification Group Services and System Aspects; Enhancements of Dedicated Core Networks selection mechanism; (Release 14)," 3GPP TR 23.711 V0.3.0, XP051087739, 3rd Generation Partnership Project, Valbonne, France (Jan. 2016).

"3rd Generation Partnership Project; Technical Specification Group Services and System Aspects; General Packet Radio Service (GPRS); Service description; Stage 2 (Release 13)," 3GPP TS 23.060 V13.6.0, 3rd Generation Partnership Project, Valbonne, France (Mar. 2016).

"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401 V13.6.1, 3rd Generation Partnership Project, Valbonne, France (Mar. 2016).

* cited by examiner

ACCESS METHOD, APPARATUS, DEVICE, AND SYSTEM

CROSS-REFERENCE

This application is a continuation of International Application No. PCT/CN2016/078378, filed on Apr. 1, 2016, which is hereby incorporated by reference in its entirety.

TECHNICAL FIELD

The present application relates to the field of communications technologies, and in particular, to an access method, apparatus, device, and system.

BACKGROUND

An operator may provide, on a same hardware platform, networks with different functions for different types of communication users. For example, the operator may provide a mobile broadband (MBB) network for a mobile broadband user, and provide a machine type communication (MTC) network for a machine type communication user.

Taking an evolved packet system (EPS) network architecture as an example, a evolved packet core network (EPC) of the EPS network architecture implements the foregoing networks with particular functions by introducing a dedicated core network (Dedicated Core, DECOR for short). A plurality of DECORs are deployed in the EPC network, and each DECOR serves a particular type of users.

When a plurality of DECORs are deployed on a network side, the network side adds a usage type attribute to user equipment (UE). The attribute is stored in a home subscriber server (HSS) as a part of subscriber data of the UE. When accessing a network, the UE first sends an attach (Attach) request or a tracking area update (TAU) request to an eNodeB (eNB). After receiving the attach request or the TAU request sent by the UE, the eNB forwards the attach request or the TAU request to a default DECOR MME stored on the eNB. After receiving the attach request or the TAU request, the default DECOR MME obtains a usage type of the UE from subscriber data stored on the HSS or a context of the UE stored on a source MME of the UE, and then determines, based on the usage type, a DECOR corresponding to the UE. When determining that the DECOR corresponding to the UE is not a DECOR in which the default DECOR MME is located, the default DECOR MME sends a redirection message to the eNB, to instruct the eNB to send the attach request or the TAU request to an MME in the DECOR corresponding to the UE. After receiving the attach request or the TAU request, the MME in the DECOR corresponding to the UE completes an access procedure of the UE.

However, the foregoing access process of the UE has the following problems:

(1) In a multi-network scenario, different networks are designed for different types of UEs, and different types of UEs have a difference in terms of a security verification mechanism. Therefore, when the DECOR in which the default DECOR MME is located is not the DECOR corresponding to the UE, the default DECOR MME may fail to complete security verification of the UE.

(2) When the DECOR corresponding to the UE is not the DECOR in which the default MME is located, the UE and the network side complete an attach procedure or a TAU procedure twice, and this causes a signaling waste, and increases a processing delay and processing load of the default DECOR MME.

(3) A function of the default DECOR MME needs to be redesigned, so that the default DECOR MME supports the foregoing procedure.

(4) In the foregoing access procedure of the UE, when the DECOR in which the default MME is located and the DECOR corresponding to the UE are different networks, the default DECOR MME obtains, in the foregoing procedure, a user context from an MME in a source DECOR in which the UE is located. This destroys network isolation.

SUMMARY

To resolve existing problems in UE access in a scenario with a plurality of dedicated core networks, this application provides an access method, apparatus, device, and system.

According to a first aspect, an access method is provided, applied to a dedicated core network, where the method includes:

receiving, by a selection function entity SFE, an access request of user equipment UE sent by a radio access network node RAN node;

determining, by the SFE, a usage type of the UE based on the access request of the UE; and selecting, by the SFE for the UE based on the usage type of the UE, a node that is in a dedicated core network and that can serve the UE, where the node that is in the dedicated core network and that can serve the UE corresponds to the usage type of the UE.

When receiving the access request of the UE, the SFE determines the usage type of the UE based on the access request of the UE, and selects, for the UE, the node in the corresponding dedicated core network based on the usage type of the UE, so as to send the access request to the node, and complete a subsequent access procedure. Therefore, a node accessed by the UE is the node in the dedicated core network corresponding to the UE, and this ensures that the node can complete security verification of the UE. In addition, in the method, an attach procedure or a TAU procedure is performed only one time, so that signaling interaction can be reduced, and a processing delay and processing load of the node are reduced. In the method, a function of the node does not need to be redesigned. In addition, interaction between dedicated core networks is avoided, and this ensures mutual isolation between the dedicated core networks.

With reference to the first aspect, in a first implementation of the first aspect, the access request includes a non-access stratum NAS request message. The NAS request message is an attach request message or a tracking area update TAU request message.

With reference to the first aspect or the first implementation of the first aspect, in a second implementation of the first aspect, the determining a usage type of the UE based on the access request of the UE includes:

directly obtaining the usage type of the UE from the access request.

In this implementation, when the access request carries the usage type of the UE, the usage type of the UE may be directly obtained from the access request. This obtaining manner is relatively simple, so that processing load of the SFE can be reduced.

With reference to the first aspect or the first implementation of the first aspect, in a third implementation of the first aspect, the determining a usage type of the UE based on the access request of the UE includes:

obtaining an ID of the UE;

sending a subscriber data request to a home subscriber server HSS, where the subscriber data request includes the ID of the UE, and the subscriber data request is used to request subscriber data of the UE;

receiving subscriber data of the UE returned by the HSS, where the subscriber data of the UE includes the usage type of the UE; and obtaining the usage type of the UE from the subscriber data of the UE.

In this implementation, if the access request does not directly carry the usage type of the UE, the HSS may be searched for the subscriber data of the UE based on the ID of the UE, to obtain the usage type of the UE.

With reference to the third implementation of the first aspect, in a fourth implementation of the first aspect, the obtaining an ID of the UE includes:

obtaining the ID of the UE from the access request; or the obtaining an ID of the UE includes:

sending an ID request to the UE, where the ID request is used to request the ID of the UE; and receiving the ID of the UE returned by the UE; or the obtaining an ID of the UE includes:

obtaining a temporary ID of the UE in the access request, where the temporary ID of the UE is allocated, to the UE, by a node in a source dedicated core network in which the UE is located;

sending a context request to the node in the source dedicated core network, where the context request includes the temporary ID of the UE, and the context request is used to request a context of the UE; and receiving the context of the UE returned by the node in the source dedicated core network, and obtaining the ID of the UE from the context of the UE.

With reference to the first aspect or the first implementation of the first aspect, in a fifth implementation of the first aspect, the determining a usage type of the UE based on the access request of the UE includes:

obtaining a temporary ID of the UE in the access request, where the temporary ID of the UE is allocated, to the UE, by a node in a source dedicated core network in which the UE is located;

sending a context request to the node in the source dedicated core network, where the context request includes the temporary ID of the UE, and the context request is used to request a context of the UE; and receiving the context of the UE returned by the node in the source dedicated core network, and obtaining the usage type of the UE from the context of the UE.

In this implementation, if the access request does not directly carry the usage type of the UE, the node in the source dedicated core network may be searched for the context of the UE based on the temporary ID of the UE, to obtain the usage type of the UE.

With reference to any one of the first aspect, or the first to the fifth implementations of the first aspect, in a sixth implementation of the first aspect, after the selecting, for the UE based on the usage type of the UE, a node that is in a dedicated core network and that can serve the UE, the method further includes:

sending a redirection message to the RAN node, where the redirection message includes information about the node that is in the corresponding dedicated core network and that is selected by the SFE for the UE, so that the RAN node sends the access request to the node in the dedicated core network corresponding to the UE.

With reference to any one of the first aspect, or the first to the fifth implementations of the first aspect, in a seventh implementation of the first aspect, after the selecting, for the UE based on the usage type of the UE, a node that is in a dedicated core network and that can serve the UE, the method further includes:

directly sending the access request to the node in the dedicated core network corresponding to the UE.

In this embodiment of the present application, the access request may be directly sent to the node, or may be sent to the node by sending the redirection message to the RAN node.

With reference to the seventh implementation of the first aspect, in an eighth implementation of the first aspect, the directly sending the access request to the node in the dedicated core network corresponding to the UE includes:

establishing an S1 connection to the node in the dedicated core network corresponding to the UE; and sending, by using the S1 connection, the access request to the node in the dedicated core network corresponding to the UE.

With reference to the seventh implementation or the eighth implementation of the first aspect, in a ninth implementation of the first aspect, after the directly sending the access request to the node in the dedicated core network corresponding to the UE, the method further includes:

forwarding, by the SFE as a forwarding node between the RAN node and the node in the dedicated core network corresponding to the UE, a message between the RAN node and the node in the dedicated core network corresponding to the UE.

With reference to the ninth implementation of the first aspect, in a tenth implementation of the first aspect, the forwarding a message between the RAN node and the node in the dedicated core network corresponding to the UE includes:

receiving a message sent by the node in the dedicated core network corresponding to the UE; and forwarding the message to the RAN node; or receiving a message sent by the RAN node; and forwarding the message to the node in the dedicated core network corresponding to the UE.

According to a second aspect, an access method is provided, where the method includes:

receiving, by a radio access network node RAN node, an access request sent by user equipment UE;

when the access request does not include an identifier of a node in a source dedicated core network of the UE, or when an identifier of a node in a source dedicated core network that is carried in the access request is not in a preconfigured node identifier table, determining, by the RAN node, that the node in the source dedicated core network is unreachable; and sending, by the RAN node, the access request to a selection function entity SFE.

When receiving the access request sent by the UE, the RAN node determines, based on the access request and the preconfigured node identifier table, whether the node in the source dedicated core network is reachable, and when determining that the node in the source dedicated core network is unreachable, sends the access request to the selection function entity SFE, so that the SFE can determine a usage type of the UE based on the access request of the UE, and select, for the UE, a node in a corresponding dedicated core network based on the usage type of the UE.

Optionally, a node identifier is a globally unique mobility management entity identifier GUMMEI or a packet temporary mobile subscriber identity P-TMSI.

With reference to the second aspect, in a first implementation of the second aspect, the method further includes:

receiving, by the RAN node, a node that is in a dedicated core network corresponding to the UE and that is determined by the selection function entity SFE, where the node in the dedicated core network corresponding to the UE is a node that is selected by the SFE for the UE based on a usage type of the UE, that is in a dedicated core network, and that can serve the UE; and sending the access request of the UE to the node in the dedicated core network corresponding to the UE.

When receiving the access request sent by the UE, the RAN node receives the node that is in the dedicated core network corresponding to the UE and that is determined by the selection function entity SFE, and sends the access request of the UE to the node in the dedicated core network corresponding to the UE, to complete a subsequent access procedure. Therefore, a node accessed by the UE is the node in the dedicated core network corresponding to the UE, and this ensures that the node can complete security verification of the UE. In addition, in the method, an attach procedure or a TAU procedure is performed only one time, so that signaling interaction can be reduced, and a processing delay and processing load of the node are reduced. In the method, a function of the node does not need to be redesigned, so that costs are reduced. In addition, interaction between dedicated core networks is avoided, and this ensures mutual isolation between the dedicated core networks.

Optionally, the node in the dedicated core network is a control plane device, and the control plane device may be an MME.

With reference to the first implementation of the second aspect, in a second implementation of the second aspect, the receiving a node that is in a dedicated core network corresponding to the UE and that is determined by the selection function entity SFE includes:

when the identifier of the node in the source dedicated core network of the UE can not be obtained or the node in the source dedicated core network of the UE is unreachable, receiving the node that is in the dedicated core network corresponding to the UE and that is determined by the selection function entity SFE.

With reference to the second implementation of the second aspect, in a third implementation of the second aspect, the receiving a node that is in a dedicated core network corresponding to the UE and that is determined by the selection function entity SFE includes:

receiving a redirection message returned by the SFE, where the redirection message includes information about the node in the dedicated core network corresponding to the UE.

With reference to the first implementation of the second aspect, in a fourth implementation of the second aspect, the sending the access request to an SFE includes:

sending the access request to the SFE, to directly send, by using the SFE, the access request to the node in the dedicated core network corresponding to the UE.

With reference to the fourth implementation of the second aspect, in a fifth implementation of the second aspect, the sending the access request to an SFE includes:

establishing an S1-Application Protocol AP connection to the SFE; and sending the access request to the SFE by using the S1-AP connection.

With reference to any one of the second aspect, or the first to the fifth implementations of the second aspect, in a sixth implementation of the second aspect, the identifier of the node in the source dedicated core network of the UE is a globally unique mobility management entity identifier GUMMEI or a packet temporary mobile subscriber identity P-TMSI.

With reference to any one of the second aspect, or the first to the sixth implementations of the second aspect, in a seventh implementation of the second aspect, the access request includes a non-access stratum NAS request message. The NAS request message is an attach request message or a tracking area update TAU request message.

With reference to any one of the second aspect, or the first to the seventh implementations of the second aspect, in an eighth implementation of the second aspect, after the sending the access request to an SFE, the method further includes:

using the SFE as a forwarding node between the RAN node and the node in the dedicated core network corresponding to the UE, to send a message to the node in the dedicated core network corresponding to the UE, or receive a message sent by the node in the dedicated core network corresponding to the UE.

With reference to any one of the second aspect, or the first to the eighth implementations of the second aspect, in a ninth implementation of the second aspect, the receiving, by a RAN node, an access request sent by UE includes:

receiving the access request sent by the UE by using a Radio Resource Control RRC message.

With reference to the ninth implementation of the second aspect, in a tenth implementation of the second aspect, the method further includes:

determining whether the RRC message carries the identifier of the node in the source dedicated core network of the UE; and when the access request carries the identifier of the node in the source dedicated core network of the UE, determining whether the node in the source dedicated core network of the UE is reachable.

According to a third aspect, an access apparatus is provided, and the apparatus includes several units, such as a receiving unit and a processing unit. The several units are configured to implement the method provided in the first aspect.

According to a fourth aspect, an access apparatus is provided, and the apparatus includes several units, such as a receiving unit, a processing unit, and a sending unit. The several units are configured to implement the method provided in the second aspect.

According to a fifth aspect, an access device is provided, where the access device includes a processor, a memory, and a communications interface, the memory is configured to store a software program and a module, and the processor runs or executes the software program and/or the module stored in the memory, to implement the following operations:

receiving an access request of user equipment UE sent by a radio access network node RAN node;

determining a usage type of the UE based on the access request of the UE; and selecting, for the UE based on the usage type of the UE, a node that is in a dedicated core network and that can serve the UE, where the node that is in the dedicated core network and that can serve the UE corresponds to the usage type of the UE.

According to a sixth aspect, an access device is provided, where the access device includes a processor, a memory, and a communications interface, the memory is configured to store a software program and a module, and the processor runs or executes the software program and/or the module stored in the memory, to implement the following operations:

receiving an access request sent by user equipment UE;

when the access request does not include an identifier of a node in a source dedicated core network of the UE, or when an identifier of a node in a source dedicated core network that is carried in the access request is not in a preconfigured node identifier table, determining that the node in the source dedicated core network is unreachable; and sending the access request to a selection function entity SFE.

According to a seventh aspect, a computer readable storage medium is provided, where the computer readable storage medium is configured to store program code executed by the foregoing processor during service transmission. The program code includes an instruction used for implementing the method provided in the first aspect.

According to an eighth aspect, a computer readable storage medium is provided, where the computer readable storage medium is configured to store program code executed by the foregoing processor during service transmission. The program code includes an instruction used for implementing the method provided in the second aspect.

According to a ninth aspect, an access system is provided, where the system includes:

an SFE, configured to: receive an access request of user equipment UE sent by a radio access network node RAN node; determine a usage type of the UE based on the access request of the UE; and select, for the UE based on the usage type of the UE, a node that is in a dedicated core network and that can serve the UE, where the node that is in the dedicated core network and that can serve the UE corresponds to the usage type of the UE; and the RAN node, configured to: receive the access request sent by the user equipment UE; when the access request does not include an identifier of a node in a source dedicated core network of the UE, or when an identifier of a node in a source dedicated core network that is carried in the access request is not in a preconfigured node identifier table, determine that the node in the source dedicated core network is unreachable; and send the access request to the selection function entity SFE.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show only some embodiments of the present application, and persons of ordinary skill in the art may still derive other drawings from these accompanying drawings without creative efforts.

DESCRIPTION OF EMBODIMENTS

Figure 1:
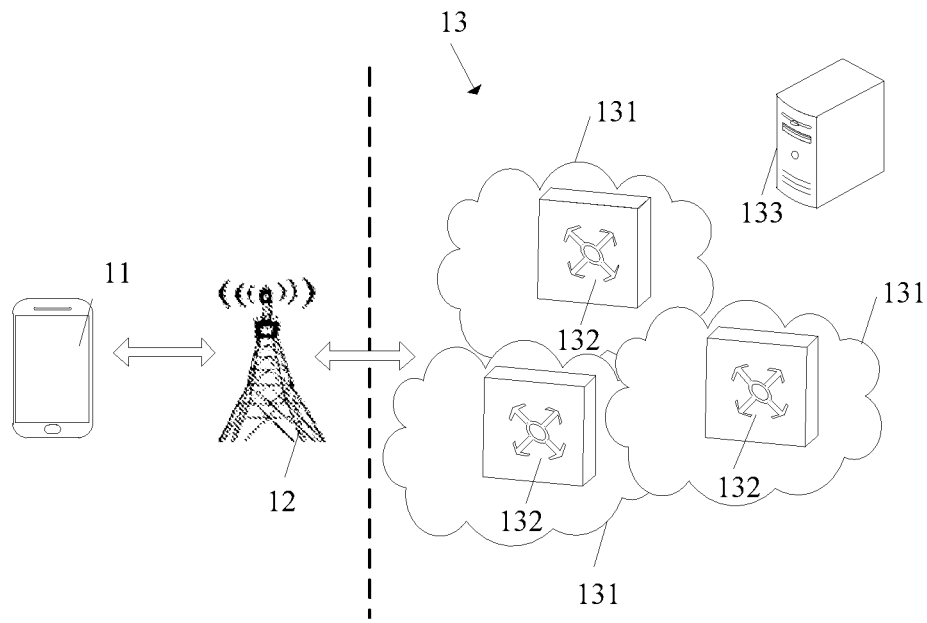
FIG. 1 is a schematic diagram of an application scenario according to an embodiment of the present application.

To make the objectives, technical solutions, and advantages of the present application clearer, the following further describes the implementations of the present application in detail with reference to the accompanying drawings.

To facilitate understanding of the technical solutions provided in the embodiments of the present application, an application scenario of the present application is first described with reference to FIG. 1.

The scenario includes UE 11, a radio access network node (RAN node) 12, and a core network (CN) 13.

The CN 13 includes a plurality of networks 131. Each network 131 is configured to provide a service for one type of terminal. Each network 131 is provided with one node used for performing control plane management, for example, a control plane device 132. A plurality of control plane devices 132 may be obtained by virtualizing one control plane network element. In addition, the CN 13 further includes an HSS 133. The network 131 may be a dedicated core network, and may also be a network slice in a future network.

The UE 11 in the present application may be a 4G terminal, and includes a handheld device, an in-vehicle device, a wearable device, or a computing device that has a wireless communication function, or another processing device connected to a wireless modem, and UE in various forms, such as a mobile station (MS), a terminal, and terminal equipment. Alternatively, the UE 11 may be a terminal supporting a 5G network, and includes but is not limited to a machine device, a sensor, a mobile terminal, or the like.

The RAN node 12 is a node in a radio access network in a general sense, and is responsible for communication between the UE 11 and the core network. The control plane device 132 is, in a general sense, a control plane in the network 131 deployed in the core network, and is responsible for session management, identity authentication, access control, and the like of a terminal.

Each network 131 is a DECOR, the RAN node 12 is an eNB, and the control plane device 132 is an MME deployed in the DECOR.

In the present application, to resolve prior-art problems, the embodiments of the present application provide a selection function entity (SFE). The SFE is a new logical network element introduced in the present application, and a main function of the SFE is to select a corresponding network for a terminal based on a usage type of the terminal, to implement network access of the terminal. The logical network element may be deployed, on a core network side, as an independent network element independent of the dedicated core network, or may be embedded, as a function module, into the control plane in the network. This is not limited in the embodiments of the present application.

Figure 2A:
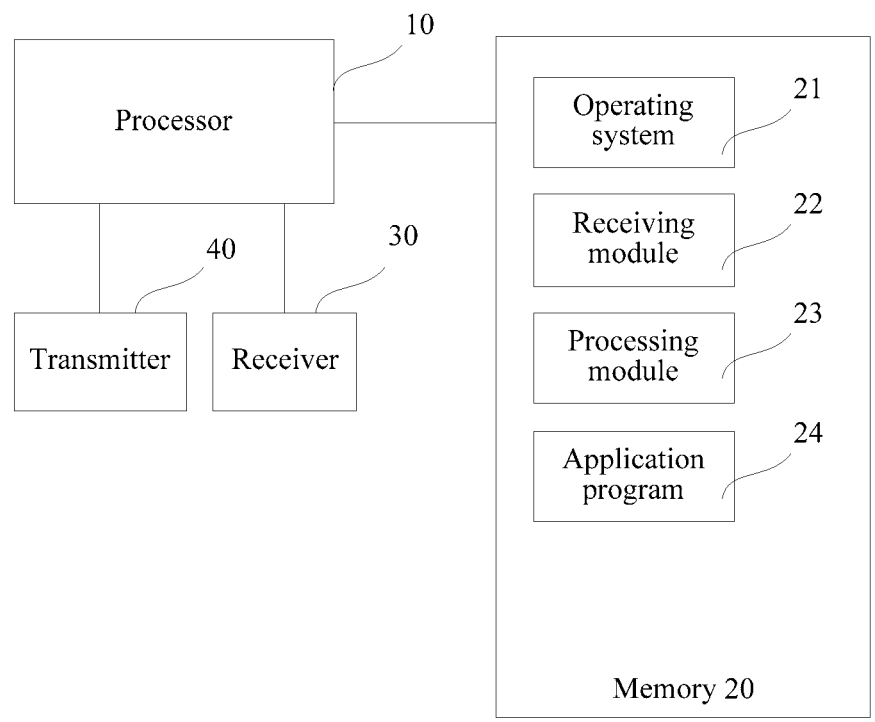
FIG. 2a is a schematic structural diagram of an SFE according to an embodiment of the present application.

FIG. 2a is a possible schematic structural diagram of hardware of an SFE. As shown in FIG. 2a, the SFE includes a processor 10, a memory 20, and a communications interface 30. Persons skilled in the art may understand that the structure shown in FIG. 2a imposes no limitation on the SFE, and the SFE may include more or fewer parts than those shown in the figure, or combine some parts, or have different part arrangements.

The processor 10 is a control center of the SFE, is connected to each part of the entire SFE by using various interfaces and lines, and performs various functions of the SFE and data processing by running or executing a software program and/or a module stored in the memory 20 and invoking data stored in the memory 20, to perform overall control on the SFE. The processor 10 may be implemented by a CPU, or may be implemented by a network processor (NP) that has a control plane function.

The memory 20 may be configured to store a software program and a module. The processor 10 runs the software program and the module that are stored in the memory 20, to perform various functional applications and data processing. The memory 20 may mainly include a program storage area and a data storage area. The program storage area may store an operating system 21, a receiving module 22, a processing module 23, an application program 24 required by at least one function (for example, location area identifier list allocation), and the like. The data storage area may store data (for example, UE location information) created based on use of the SFE, and the like. The memory 20 may be implemented by any type of volatile or non-volatile storage device or by a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc. Correspondingly, the memory 20 may further include a memory controller, so that the processor 10 can access the memory 20.

The processor 10 performs the following function by running the receiving module 22: receiving an access request of user equipment UE sent by a radio access network node RAN node. The processor 10 performs the following functions by running the processing module 23: determining a usage type of the UE based on the access request of the UE; and selecting, for the UE based on the usage type of the UE, a node that is in a dedicated core network and that can serve the UE, where the node that is in the dedicated core network and that can serve the UE corresponds to the usage type of the UE.

Figure 2B:
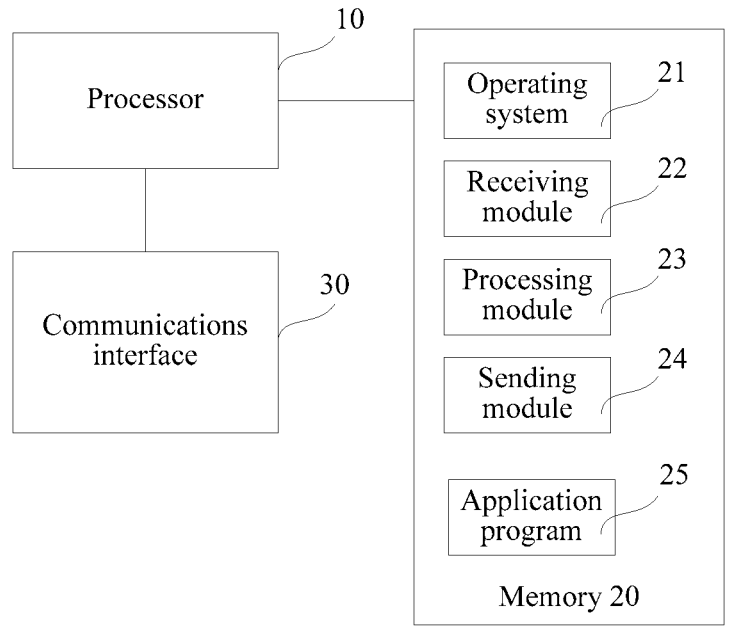
FIG. 2b is a schematic structural diagram of a RAN node according to an embodiment of the present application.

FIG. 2b is a possible schematic structural diagram of hardware of the RAN node shown in FIG. 1. As shown in FIG. 2b, the RAN node 12 includes a processor 10, a memory 20, a receiver 30, and a transmitter 40. Persons skilled in the art may understand that the structure shown in FIG. 2b imposes no limitation on the RAN node, and the RAN node may include more or fewer parts than those shown in the figure, or combine some parts, or have different part arrangements.

The processor 10 is a control center of the RAN node, is connected to each part of the entire RAN node by using various interfaces and lines, and performs various functions of the RAN node and data processing by running or executing a software program and/or a module stored in the memory 20 and invoking data stored in the memory 20, to perform overall control on the RAN node. The processor 10 may be implemented by a CPU, or may be implemented by a network processor (English: network processor, NP for short) that has a control plane function.

The memory 20 may be configured to store a software program and a module. The processor 10 runs the software program and the module that are stored in the memory 20, to perform various functional applications and data processing. The memory 20 may mainly include a program storage area and a data storage area. The program storage area may store an operating system 21, a receiving module 22, a processing module 23, a sending module 24, an application program 25 required by at least one function (for example, location area identifier list allocation), and the like. The data storage area may store data (for example, UE location information) created based on use of the RAN node, and the like. The memory 20 may be implemented by any type of volatile or non-volatile storage device or by a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc. Correspondingly, the memory 20 may further include a memory controller, so that the processor 10 can access the memory 20.

The processor 10 performs the following function by running the receiving module 22: receiving an access request sent by user equipment UE. The processor 10 performs the following function by running the processing module 23: when the access request does not include an identifier of a node in a source dedicated core network of the UE, or when an identifier of a node in a source dedicated core network that is carried in the access request is not in a preconfigured node identifier table, determining that the node in the source dedicated core network is unreachable. The processor 10 performs the following function by running the sending module 24: sending the access request to a selection function entity SFE.

Figure 3:
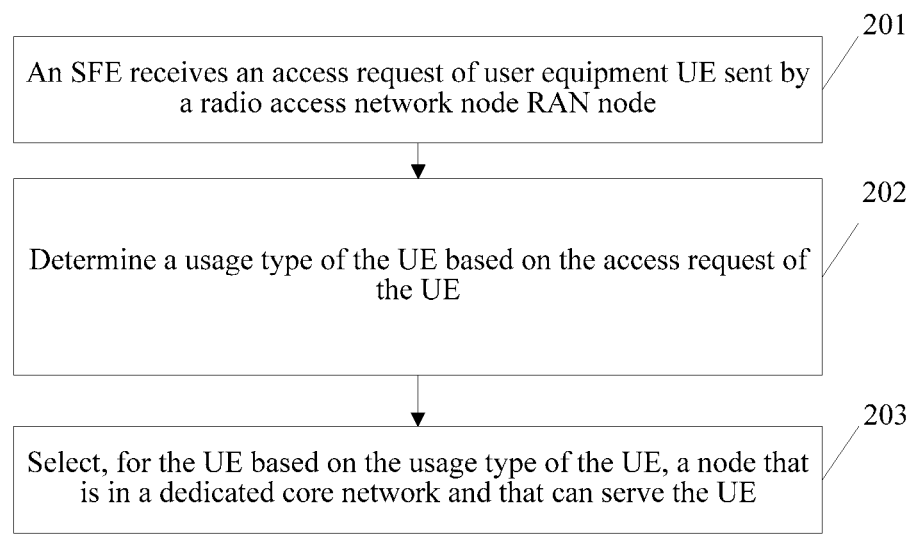
FIG. 3 is a flowchart of an access method according to an embodiment of the present application.

FIG. 3 is a flowchart of an access method according to an embodiment of the present application. The method may be executed by the SFE in the foregoing application scenario. As shown in FIG. 3, the method includes the following steps:

Step 201: The SFE receives an access request of user equipment UE sent by a radio access network node RAN node.

Step 202: Determine a usage type of the UE based on the access request of the UE.

Step 203: Select, for the UE based on the usage type of the UE, a node that is in a dedicated core network and that can serve the UE, where the node that is in the dedicated core network and that can serve the UE corresponds to the usage type of the UE.

It should be understood that, the selecting, by the SFE, for the UE based on the usage type of the UE, a node that is in a dedicated core network and that can serve the UE may include:

directly selecting, for the UE based on the usage type of the UE, the node that is in the dedicated core network and that can serve the UE; or selecting, for the UE based on information other than the usage type of the UE in subscriber data of the UE and/or a local policy preconfigured on the SFE, and the usage type of the UE, the node that is in the dedicated core network and that can serve the UE.

The information other than the usage type of the UE in the subscriber data includes but is not limited to a roaming protocol. The local policy preconfigured on the SFE includes but is not limited to a network congestion status, local network deployment, or the like.

Specifically, in this embodiment of the present application, steps 202 and 203 include two implementations. For a first implementation, refer to FIG. 5 and FIG. 6. For a second implementation, refer to FIG. 7 and FIG. 8.

In this embodiment of the present application, when receiving the access request of the UE, the SFE determines the usage type of the UE based on the access request of the UE, and selects, for the UE, the node in the corresponding dedicated core network based on the usage type of the UE, so as to send the access request to the node, and complete a subsequent access procedure. Therefore, a node accessed by the UE is the node in the dedicated core network corresponding to the UE, and this ensures that the node can complete security verification of the UE. In addition, in the method, an attach procedure or a TAU procedure is performed only one time, so that signaling interaction can be reduced, and a processing delay and processing load of the node are reduced. In the method, a function of the node does not need to be redesigned. In addition, interaction between dedicated core networks is avoided, and this ensures mutual isolation between the dedicated core networks.

Figure 4:
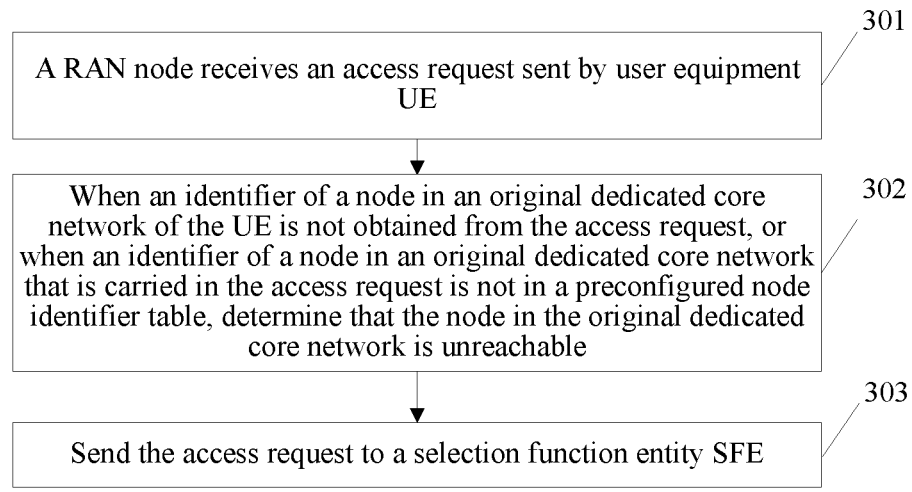
FIG. 4 is a flowchart of another access method according to an embodiment of the present application.

FIG. 4 is a flowchart of an access method according to an embodiment of the present application. The method may be executed by the RAN node in the foregoing application scenario. As shown in FIG. 4, the method includes the following steps:

Step 301: The RAN node receives an access request sent by user equipment UE.

Step 302: When the access request does not include an identifier of a node in a source dedicated core network of the UE, or when an identifier of a node in a source dedicated core network that is carried in the access request is not in a preconfigured node identifier table, determine that the node in the source dedicated core network is unreachable.

Step 303: Send the access request to a selection function entity SFE.

In this embodiment of the present application, the RAN node determines, based on the access request and the preconfigured node identifier table, whether the node in the source dedicated core network is reachable, and when determining that the node in the source dedicated core network is unreachable, sends the access request to the selection function entity SFE, so that the SFE can determine a usage type of the UE based on the access request of the UE, and select, for the UE, a node in a corresponding dedicated core network based on the usage type of the UE. The RAN node determines, through the selection function entity SFE, the node in the dedicated core network corresponding to the UE, and sends the access request of the UE to the node in the dedicated core network corresponding to the UE, to complete a subsequent access procedure. Therefore, a node accessed by the UE is the node in the dedicated core network corresponding to the UE, and this ensures that the node can complete security verification of the UE. In addition, in the method, an attach procedure or a TAU procedure is performed only one time, so that signaling interaction can be reduced, and a processing delay and processing load of the node are reduced. In the method, a function of the node does not need to be redesigned, so that costs are reduced. In addition, interaction between dedicated core networks is avoided, and this ensures mutual isolation between the dedicated core networks.

Figure 5:
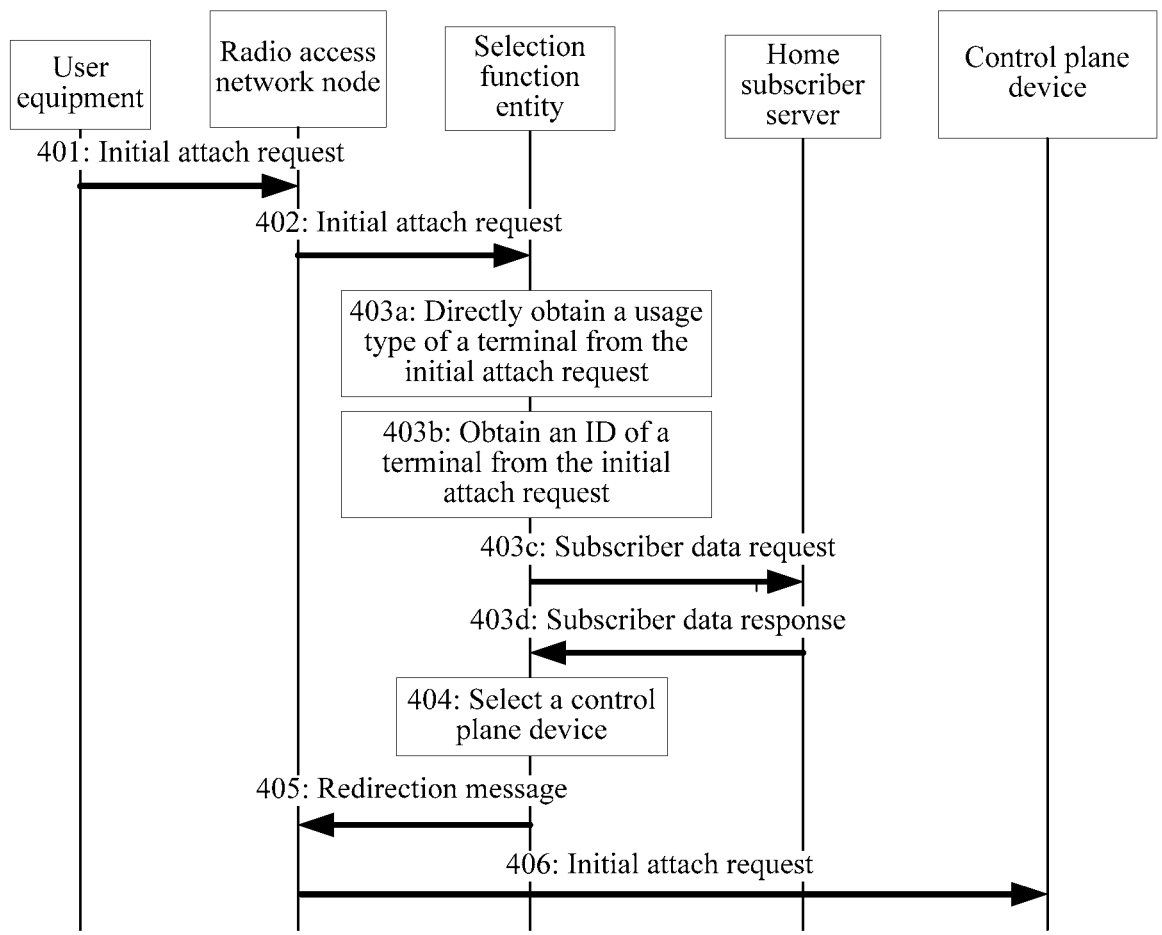
FIG. 5 is a flowchart of another access method according to an embodiment of the present application.

FIG. 5 is a flowchart of an access method according to an embodiment of the present application. In this embodiment, an example in which UE initially accesses a dedicated core network (a network for short) and a node in the dedicated core network is a control plane device is used, to describe in detail the access methods that are executed by the SFE and the RAN node and that are provided in FIG. 3 and FIG. 4. As shown in FIG. 5, the method includes the following steps.

Step 401: The UE sends an initial attach request to the RAN node, where the initial attach request is an attach request sent by the UE when the UE performs initial network accessing.

Because the UE performs initial accessing, the UE has not accessed the corresponding network, and no control plane device identifier (for example, a globally unique mobility management entity identifier (Globally Unique MME identifier, GUMMEI for short) or a packet temporary mobile subscriber identity (P-TMSI) has been allocated to the UE.

Specifically, that the UE sends an initial attach request to the RAN node includes:

sending, by the UE, the initial attach request to the RAN node by using an RRC message, where the RRC message is a message that is sent by the UE to the RAN node in a process in which the UE establishes an RRC connection to the RAN node.

Step 402: The RAN node sends the initial attach request to the SFE, and the SFE receives the initial attach request of the UE sent by the RAN node.

The SFE is a new logical network element in the present application, and the RAN node stores related information of the SFE, such as address information.

That the RAN node sends the initial attach request to the SFE may include:

establishing, by the RAN node, an S1-Application Protocol (Application Protocol, AP for short) connection to the SFE; and sending the initial attach request to the SFE by using the S1-AP connection.

Further, because the RAN node does not know whether the UE performs initial accessing, before the RAN node sends the initial attach request to the SFE, the method further includes:

determining, by the RAN node, whether the RRC message includes an identifier (such as a globally unique mobility management entity identifier GUMMEI or a packet temporary mobile subscriber identity P-TMSI) of a control plane device in a source network of the UE. Because the UE performs initial accessing, the RRC message does not include the identifier of the control plane device in the source network of the UE (namely, the RAN node does not obtain the identifier of the control plane device in the source network of the UE), and therefore the RAN node sends the initial attach request to the SFE.

After receiving the initial attach request, the SFE performs step 403a. If failing to perform step 403a, the SFE performs step S403b to step 403d. Certainly, the SFE may not perform step 403a, but directly perform step 403b to step 403d. Step 403a and step 403b to step 403d are used to determine a usage type of the UE.

Step 403*a*: The SFE directly obtains a usage type of the UE from the initial attach request.

In the present application, the usage type may be used as an optional field of the initial attach request.

Step 403*b*: The SFE obtains an ID of the UE from the initial attach request.

The initial attach request includes the ID of the UE.

Step 403*c*: The SFE sends a subscriber data request (Subscriber Data Request) to an HSS, where the subscriber data request includes the ID of the UE, and the subscriber data request is used to request subscriber data (Subscriber Data) of the UE.

Step 403*d*: The SFE receives the subscriber data of the UE returned by the HSS, and obtains a usage type of the UE from the subscriber data of the UE, where the subscriber data of the UE includes the usage type of the UE.

Specifically, a subscriber data response (Subscriber Data Response) returned by the HSS is received, and the subscriber data response includes the subscriber data of the UE.

Step 404: The SFE selects, for the UE, a control plane device based on the usage type of the UE.

Specifically, because there is a correspondence between different types of UEs and networks, a correspondence between a usage type and a control plane device may be stored in the SFE in advance. After obtaining the usage type of the UE, the SFE selects a control plane device corresponding to the usage type of the UE based on the correspondence between a usage type and a control plane device and the usage type of the UE.

The correspondence between a usage type and a control plane device may be set in the following manner: A mobile broadband user corresponds to a control plane device in a mobile broadband network; a machine type communication user corresponds to a control plane device in a machine type communication network; or an inter-vehicle communication user corresponds to a control plane device in an inter-vehicle communication network. Certainly, the foregoing correspondence is only an example. This is not limited in this embodiment of the present application.

It should be understood that, that the SFE selects, for the UE based on the usage type of the UE, a node that is in a dedicated core network and that can serve the UE may include:

directly selecting, for the UE based on the usage type of the UE, the node that is in the dedicated core network and that can serve the UE; or selecting, for the UE based on information other than the usage type of the UE in the subscriber data of the UE and/or a local policy preconfigured on the SFE, and the usage type of the UE, the node that is in the dedicated core network and that can serve the UE.

The information other than the usage type of the UE in the subscriber data includes but is not limited to a roaming protocol. The local policy preconfigured on the SFE includes but is not limited to a network congestion status, local network deployment, or the like.

In an implementation, the selecting, for the UE based on information other than the usage type of the UE in the subscriber data of the UE and/or a local policy preconfigured on the SFE, and the usage type of the UE, the node that is in the dedicated core network and that can serve the UE may include:

selecting, by the SFE for the UE, a control plane device based on the usage type of the UE; and when the selected control plane device meets a requirement of the information other than the usage type of the UE in the subscriber data of the UE and/or the local policy preconfigured on the SFE, determining that the control plane device is a control plane device that can serve the UE; or when the selected control plane device does not meet a requirement of the information other than the usage type of the UE in the subscriber data of the UE and/or the local policy preconfigured on the SFE, selecting another control plane device as a control plane device that can serve the UE.

The meeting a requirement of the information other than the usage type of the UE in the subscriber data of the UE and/or the local policy preconfigured on the SFE may include: matching the information (such as the roaming protocol) other than the usage type of the UE in the subscriber data of the UE, or meeting a policy (such as the network congestion status) in the local policy.

For example, when selecting, for the UE, a control plane device based on the usage type of the UE, the SFE may refer to the roaming protocol of the UE in the subscriber data. If a roaming service is not enabled for the UE, and the control plane device selected for the UE based on the usage type of the UE is at a roaming location, the control plane device cannot be used as the control plane device that can serve the UE.

For another example, when selecting, for the UE, a control plane device based on the usage type of the UE, the SFE may refer to a local congestion status on the SFE. If congestion of a network in which the control plane device selected for the UE based on the usage type of the UE is located is greater than a preset value, the control plane device cannot be used as the control plane device that can serve the UE.

Step 403*a*, step 403*b* to step 403*d*, and step 404 are used to select the control plane device for the UE.

Step 405: The SFE sends a redirection message to the RAN node, where the redirection message includes information about the control plane device corresponding to the usage type of the UE, and the RAN node receives the redirection message returned by the SFE.

The information about the control plane device may include an identifier or an IP address of the control plane device.

Step 406: The RAN node sends the initial attach request of the UE to the control plane device.

That the RAN node sends the initial attach request of the UE to the control plane device may include:

establishing, by the RAN node, an S1 connection to the control plane device; and sending the initial attach request of the UE to the control plane device by using the S1 connection.

After step 406, the UE, the RAN node, and the control plane device complete an attach procedure in a normal manner. In this way, network access of the UE can be implemented.

In this embodiment of the present application, after receiving the initial attach request sent by the UE, the RAN node directly sends the initial attach request to the SFE, then receives the redirection message returned by the SFE, where the redirection message includes the information about the control plane device (such as an MME) selected by the SFE for the UE based on the usage type of the UE, and then sends the initial attach request of the UE to the control plane device, to complete a subsequent access procedure. In the method, the SFE selects, for the UE, the control plane device based on the usage type of the UE, and then the UE accesses a network in which the control plane device is located, namely, the control plane device accessed by the UE is a control plane device in a network corresponding to the UE, and this ensures that the control plane device can complete security verification of the UE. In addition, in the method, an attach procedure or a TAU procedure is performed only one time, so that signaling interaction can be reduced, and a processing delay and processing load of the control plane device are reduced. In the method, a function of the control plane device does not need to be redesigned. In addition, interaction between networks is avoided, and this ensures mutual isolation between the networks.

Figure 6:
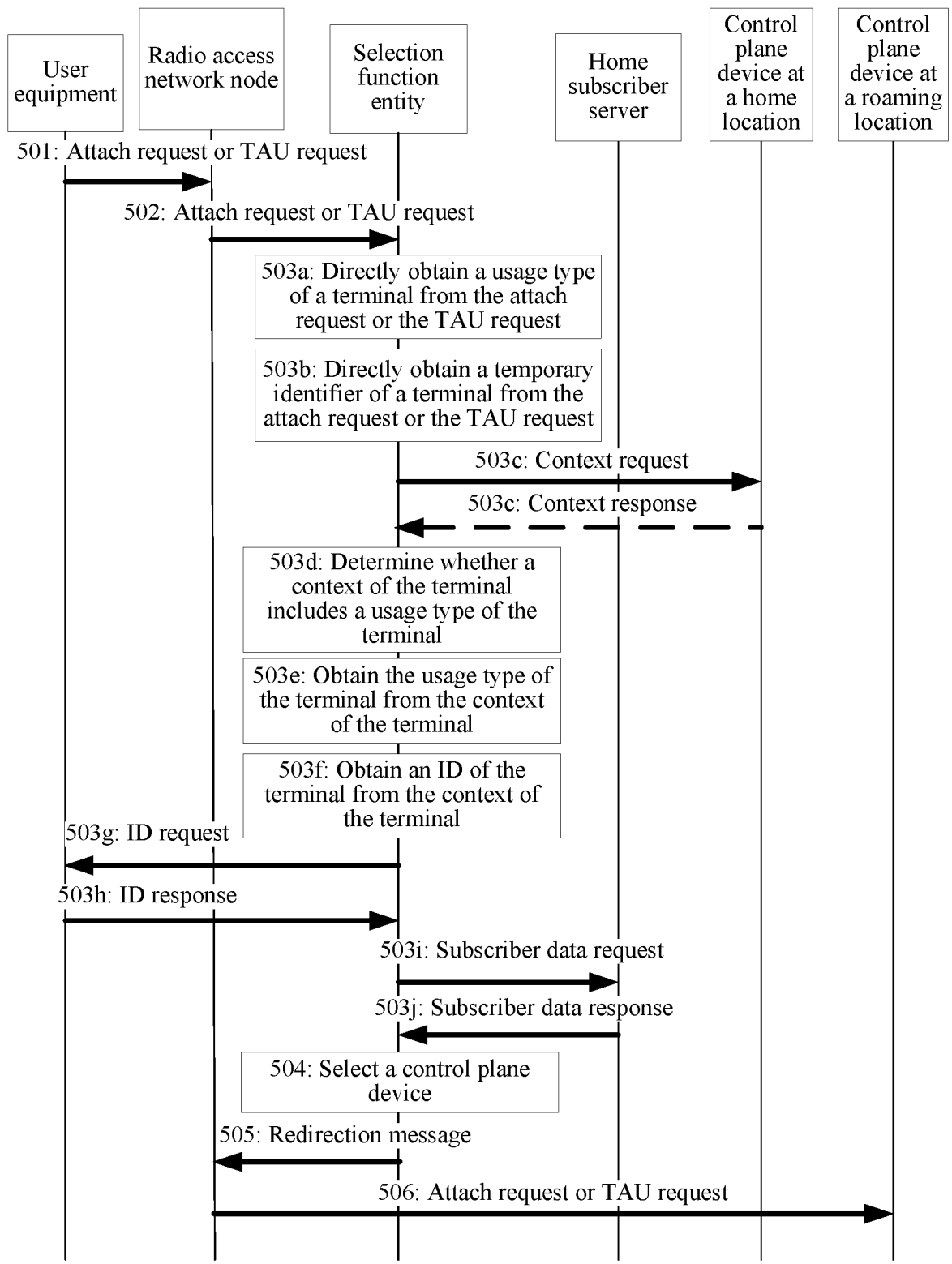
FIG. 6 is a flowchart of another access method according to an embodiment of the present application.

FIG. 6 is a flowchart of an access method according to an embodiment of the present application. In this embodiment, an example in which UE moves from a home location to a visited location is used, to describe in detail the access methods that are executed by the SFE and the RAN node and that are provided in FIG. 3 and FIG. 4. As shown in FIG. 6, the method includes the following steps.

Step 501: The UE sends an attach request or a TAU request to the RAN node.

Specifically, that the UE sends an attach request or a TAU request to the RAN node includes:

sending, by the UE, the attach request or the TAU request to the RAN node by using an RRC message, where the RRC message is a message that is sent by the UE to the RAN node in a process in which the UE establishes an RRC connection to the RAN node.

The UE has performed registration at the home location and obtained a temporary identifier allocated by a home network. The temporary identifier includes a control plane device identifier. In this case, when initiating an attach request or a TAU request at the visited location, the UE adds the control plane device identifier to the RRC message and transmits the RRC message to the RAN node (at the visited location).

Step 502: The RAN node sends the attach request or the TAU request to the SFE, and the SFE receives the attach request or the TAU request of the UE sent by the RAN node.

The SFE is a new logical network element in the present application, and the RAN node stores related information of the SFE, such as address information.

That the RAN node sends the attach request or the TAU request to the SFE may include:

establishing, by the RAN node, an S1-AP connection to the SFE; and sending the attach request or the TAU request to the SFE by using the S1-AP connection.

Further, before the RAN node sends the attach request or the TAU request to the SFE, the method further includes:

determining, by the RAN node, whether the RRC message includes an identifier of a control plane device in a source network of the UE; and when the RRC message includes the identifier of the control plane device in the source network of the UE, determining whether the control plane device in the source network of the UE is reachable. Because the control plane device in the source network of the UE is a control plane device at the home location of the UE, the RAN node at the visited location determines that the control plane device is unreachable, and in this case, the RAN node sends the attach request or the TAU request to the SFE.

Specifically, the determining whether the control plane device in the source network of the UE is reachable includes:

preconfiguring a table of identifiers of accessible nodes; and determining, based on the node identifier table, that the identifier of the control plane device in the source network is not in the node identifier table, and determining that the control plane device in the source network is unreachable.

After receiving the attach request or the TAU request, the SFE performs step 503*a*. If failing to perform step 503*a*, the SFE performs step S503*b* to step 503*j*. Certainly, the SFE may not perform step 503*a*, but directly perform step 503*b* to step 503*j*. Step 503*a* and step 503*b* to step 503*j* are used to determine a usage type of the UE.

Step 503*a*: The SFE directly obtains a usage type of the UE from the attach request or the TAU request.

In the present application, the usage type may be used as an optional field of the attach request or the TAU request.

Step 503*b*: The SFE obtains a temporary identifier of the UE from the attach request or the TAU request.

The attach request or the TAU request includes the temporary identifier of the UE, and the temporary identifier of the UE includes the identifier of the control plane device in the source network of the UE.

Step 503*c*: The SFE sends a context request to a control plane device (a control plane device at a home location) in a source network of the UE, where the context request includes the temporary identifier of the UE, and the context request is used to request a context of the UE. The SFE may learn of the control plane device in the source network of the UE based on the temporary identifier of the UE. When receiving the context of the UE returned by the control plane device in the source network, the SFE performs step 503*d* and step 503*e*; or when the SFE does not receive the context of the UE returned by the control plane device in the source network, performs step 503*g* to step 503*j*.

Specifically, the SFE receives a context response returned by the control plane device in the source network, and the context response may include the context of the UE.

If the context of the UE is deleted from the control plane device in the source network, the SFE receives no context of the UE returned by the control plane device in the source network.

Step 503*d*: Determine whether the context of the UE includes a usage type of the UE; and when the context of the UE includes the usage type of the UE, performs step 503*e*; or when the context of the UE includes the usage type of the UE, performs step 503*f*.

Step 503*e*: Obtain the usage type of the UE from the context of the UE, where the context of the UE includes the usage type of the UE.

Step 503*f*: Obtain an ID of the UE from the context of the UE, where the context of the UE includes the ID of the UE, and then perform steps 503*i* and 503*j*.

Step 503*g*: The SFE sends an ID request (Identity Request) to the UE.

Step 503*h*: The SFE receives the ID of the UE returned by the UE.

Specifically, an ID response (Identity Response) returned by the UE is received, and the identity response includes the ID of the UE.

Step 503*i*: The SFE sends a subscriber data request to an HSS, where the subscriber data request includes the ID of the UE, and the subscriber data request is used to request subscriber data of the UE.

Step 503*j*: The SFE receives the subscriber data of the UE returned by the HSS, and obtains the usage type of the UE from the subscriber data of the UE, where the subscriber data of the UE includes the usage type of the UE.

Specifically, a subscriber data response returned by the HSS is received, and the subscriber data response includes the subscriber data of the UE.

Step 504: The SFE selects, for the UE, a control plane device (a control plane device at a roaming location) based on the usage type of the UE.

A specific process of step 504 is the same as that of step 404.

Step 505: The SFE sends a redirection message to the RAN node, where the redirection message includes information about the control plane device corresponding to the usage type of the UE, and the RAN node receives the redirection message returned by the SFE.

A specific process of step 505 is the same as that of step 405.

Step 506: The RAN node sends the attach request or the TAU request of the UE to the control plane device.

A specific process of step 506 is the same as that of step 406.

In this embodiment of the present application, when the RAN node receives the access request sent by the UE, if the control plane device in the source network of the UE is unreachable, the RAN node directly sends the access request to the SFE, then receives the redirection message returned by the SFE, where the redirection message includes the information about the control plane device (such as an MME) selected by the SFE for the UE based on the usage type of the UE, and then sends the access request of the UE to the control plane device, to complete a subsequent access procedure. In the method, the SFE selects, for the UE, the control plane device based on the usage type of the UE, and then the UE accesses a network in which the control plane device is located, namely, the control plane device accessed by the UE is a control plane device in a network corresponding to the UE, and this ensures that the control plane device can complete security verification of the UE. In addition, in the method, an attach procedure or a TAU procedure is performed only one time, so that signaling interaction can be reduced, and a processing delay and processing load of the control plane device are reduced. In the method, a function of the control plane device does not need to be redesigned. In addition, interaction between networks is avoided, and this ensures mutual isolation between the networks.

Figure 7:
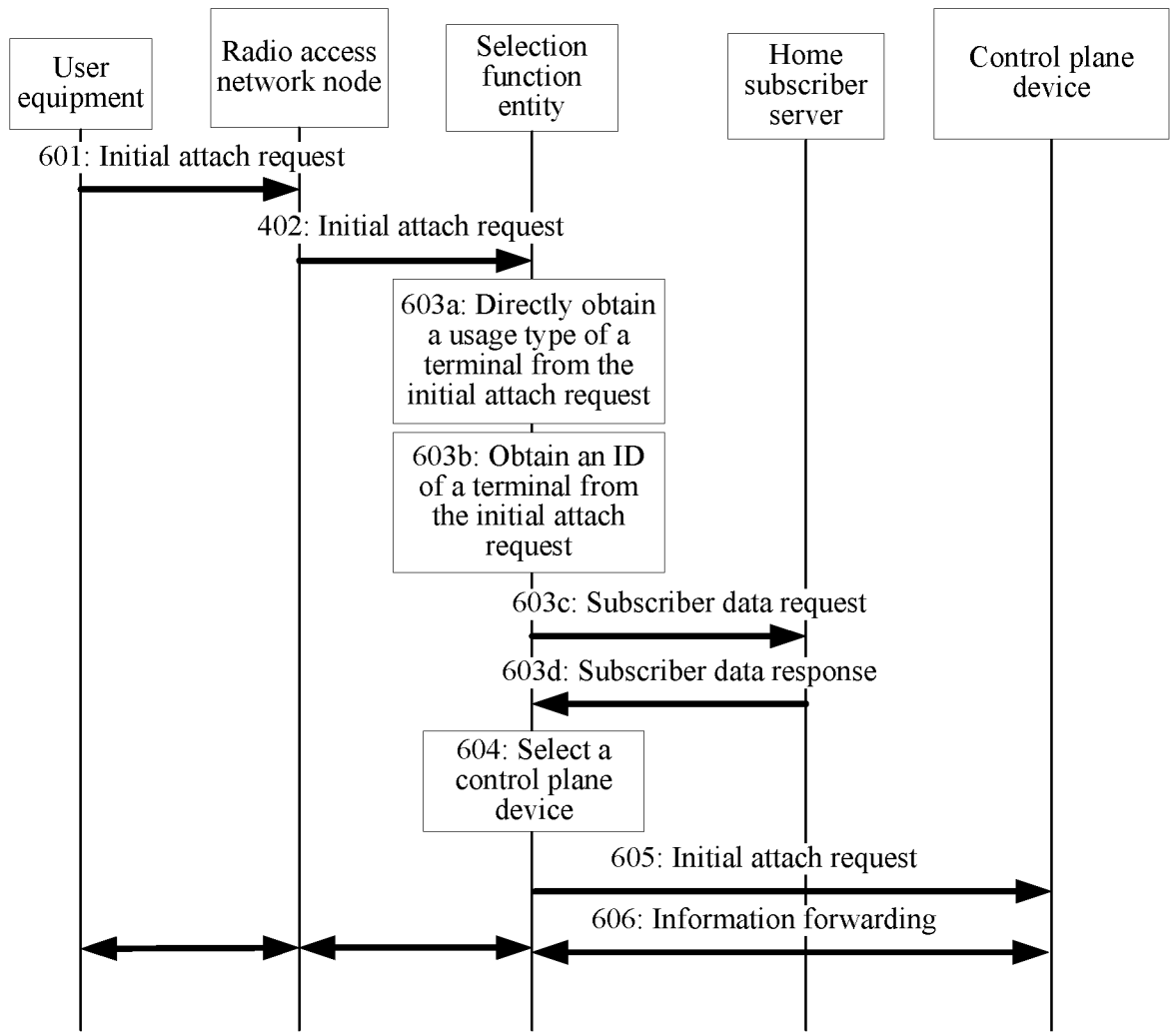
FIG. 7 is a flowchart of another access method according to an embodiment of the present application.

FIG. 7 is a flowchart of an access method according to an embodiment of the present application. In this embodiment, an example in which UE performs initial network accessing is used, to describe the present application in detail. As shown in FIG. 7, in the procedure shown in the figure, the UE interacts with an SFE. A procedure in which the SFE selects, for the UE, a control plane device is the same as that in FIG. 5 (namely, steps 601 to 604 are the same as steps 401 to 404 in FIG. 5). A difference between FIG. 7 and FIG. 5 mainly lies in a subsequent procedure (steps 605 and 606). The method includes the following steps.

Step 601: The UE sends an initial attach request (Initial Attach Request) to a RAN node, where the initial attach request is an attach request sent by the UE when the UE performs initial network accessing.

Step 602: The RAN node sends the initial attach request to the SFE, and the SFE receives the initial attach request of the UE sent by the RAN node.

After receiving the initial attach request, the SFE performs step 603a. If failing to perform step 603a, the SFE performs step S603b to step 603d. Certainly, the SFE may not perform step 603a, but directly perform step 603b to step 603d. Step 603a and step 603b to step 603d are used to determine a usage type of the UE.

Step 603a: The SFE directly obtains a usage type of the UE from the initial attach request.

Step 603b: The SFE obtains an ID of the UE from the initial attach request.

Step 603c: The SFE sends a subscriber data request to an HSS, where the subscriber data request includes the ID of the UE, and the subscriber data request is used to request subscriber data of the UE.

Step 603d: The SFE receives the subscriber data of the UE returned by the HSS, and obtains a usage type of the UE from the subscriber data of the UE, where the subscriber data of the UE includes the usage type of the UE.

Step 604: The SFE selects, for the UE, a control plane device based on the usage type of the UE.

Step 603a, step 603b to step 603d, and step 604 are used to select the control plane device for the UE.

Step 605: The SFE sends the initial attach request of the UE to the control plane device.

After selecting the control plane device for the UE, the SFE may find information about the control plane device, to send the initial attach request of the UE to the control plane device. The information about the control plane device may include an identifier or an IP address of the control plane device.

Step 605 may include: establishing an S1 connection to the control plane device, and sending the initial attach request to the control plane device by using the S1 connection.

Step 606: As a forwarding node between the control plane device and the RAN node, the SFE forwards a message between the control plane device and the RAN node, to complete the access process.

Specifically, a message sent by the control plane device or the RAN node is received, and the message sent by the control plane device or the RAN node is forwarded to the RAN node or the control plane device.

Specifically, a process in which the SFE forwards the message includes: caching the message, and forwarding the message to the RAN node or the control plane device after route modification of the message is completed.

The message includes a security verification message, an accept message, or the like. In the foregoing message transmission process, the control plane device transmits, to the UE by using a message, a temporary identifier (GUTI) allocated to the UE.

Specifically, the control plane device may add the temporary identifier (GUTI) allocated to the UE to a non-access stratum accept message (NAS Accept message), and transmit the non-access stratum accept message to the RAN node by using the SFE, and then the RAN node forwards the non-access stratum accept message to the UE. The temporary identifier includes the identifier of the control plane device. The UE adds the identifier of the control plane device to a subsequent service request message, and the RAN node may directly send the service request message of the UE to the control plane device based on the identifier of the control plane device.

After step 606, the UE, the RAN node, and the control plane device perform subsequent interaction in a normal manner, to be specific, after accessing is completed this time, the RAN node may directly interact with the control plane device based on the temporary identifier, to forward a message between the UE and the control plane device, without using the SFE.

In this embodiment of the present application, after receiving the initial attach request sent by the UE, the RAN node directly sends the initial attach request to the SFE, and the SFE selects, for the UE, the control plane device (such as an MME) based on the usage type of the UE, and then sends the initial attach request of the UE to the control plane device, to complete a subsequent access procedure. In the method, the SFE selects, for the UE, the control plane device based on the usage type of the UE, and then the UE accesses a network in which the control plane device is located, namely, the control plane device accessed by the UE is a control plane device in a network corresponding to the UE, and this ensures that the control plane device can complete security verification of the UE. In addition, in the method, an attach procedure or a TAU procedure is performed only one time, so that signaling interaction can be reduced, and a processing delay and processing load of the control plane device are reduced. In the method, a function of the control plane device does not need to be redesigned. In addition, interaction between networks is avoided, and this ensures mutual isolation between the networks.

Figure 8:
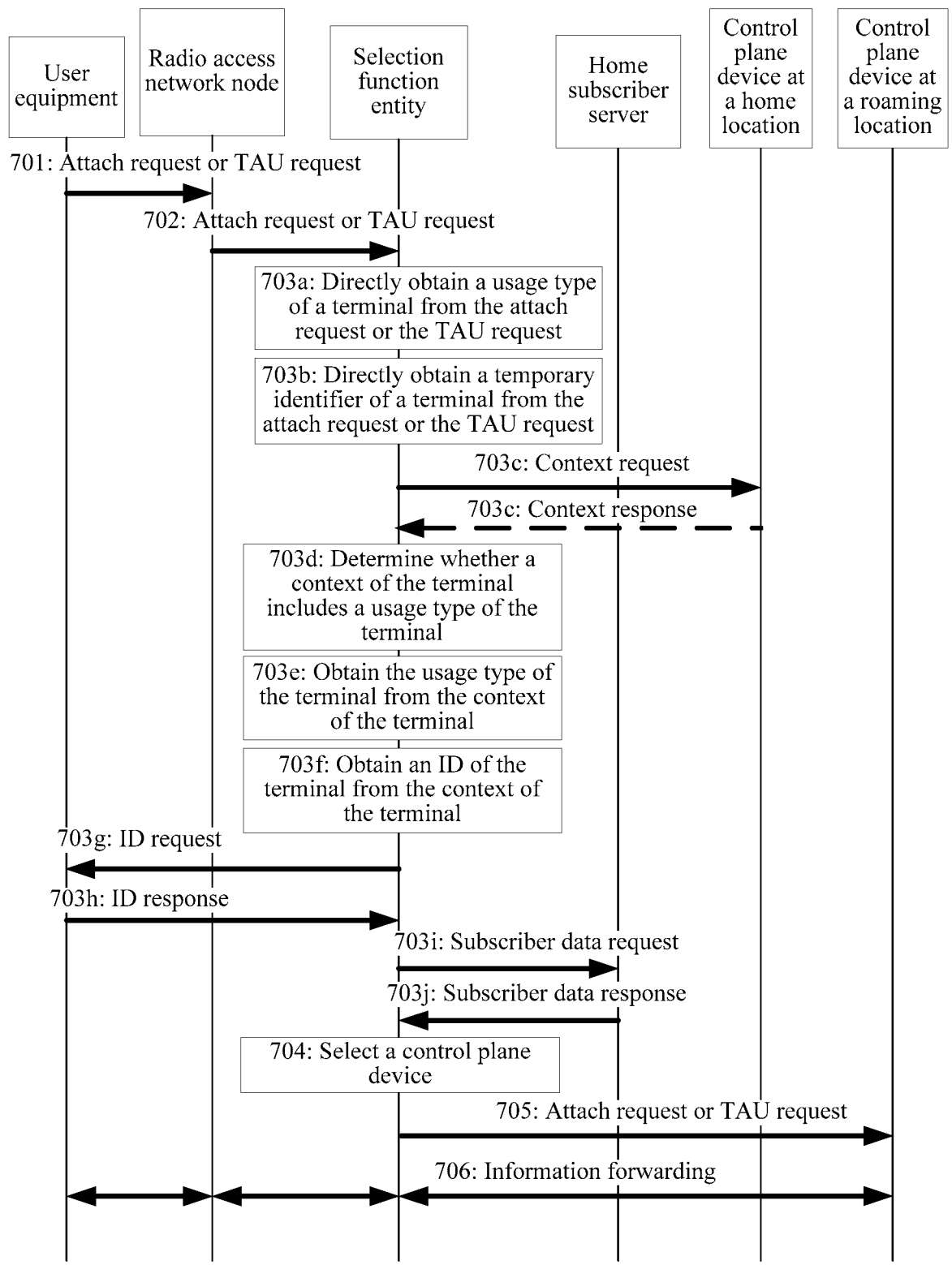
FIG. 8 is a flowchart of another access method according to an embodiment of the present application.

FIG. 8 is a flowchart of an access method according to an embodiment of the present application. In this embodiment, an example in which UE moves from a home location to a visited location is used, to describe the present application in detail. As shown in FIG. 8, in the procedure shown in the figure, the UE interacts with an SFE. A procedure in which the SFE selects, for the UE, a control plane device is the same as that in FIG. 6 (namely, steps 701 to 704 are the same as steps 501 to 504 in FIG. 6). A difference between FIG. 8 and FIG. 6 mainly lies in a subsequent procedure (steps 705 and 706). The method includes the following steps:

Step 701: The UE sends an attach request or a TAU request to a RAN node.

Step 702: The RAN node sends the attach request or the TAU request to the SFE, and the SFE receives the attach request or the TAU request of the UE sent by the RAN node.

After receiving the attach request or the TAU request, the SFE performs step 703a. If failing to perform step 703a, the SFE performs step S703b to step 703j. Certainly, the SFE may not perform step 703a, but directly perform step 703b to step 703j. Step 703a and step 703b to step 703j are used to determine a usage type of the UE.

Step 703a: The SFE directly obtains a usage type of the UE from the attach request or the TAU request.

Step 703b: The SFE obtains a temporary identifier of the UE from the attach request or the TAU request.

Step 703c: The SFE sends a context request to a control plane device (a control plane device at the home location) in a source network of the UE, where the context request includes the temporary identifier of the UE, and the context request is used to request a context of the UE. When receiving the context of the UE returned by the control plane device in the source network, the SFE performs step 703d and step 703e; or otherwise, performs step 703g to step 703j.

Step 703d: Determine whether the context of the UE includes a usage type of the UE; and when the context of the UE includes the usage type of the UE, performs step 703e; or otherwise, performs step 703f.

Step 703e: Obtain the usage type of the UE from the context of the UE, where the context of the UE includes the usage type of the UE.

Step 703f: Obtain an ID of the UE from the context of the UE, where the context of the UE includes the ID of the UE, and then perform steps 703i and 703j.

Step 703g: The SFE sends an ID request (Identity Request) to the UE.

Step 703h: The SFE receives the ID of the UE returned by the UE.

Step 703i: The SFE sends a subscriber data request to an HSS, where the subscriber data request includes the ID of the UE, and the subscriber data request is used to request subscriber data of the UE.

Step 703j: The SFE receives the subscriber data of the UE returned by the HSS, and obtains the usage type of the UE from the subscriber data of the UE, where the subscriber data of the UE includes the usage type of the UE.

Step 704: The SFE selects, for the UE, a control plane device (a control plane device at a roaming location) based on the usage type of the UE.

Step 705: The SFE sends the initial attach request of the UE to the control plane device.

A specific process of step 705 is the same as that of step 605.

Step 706: As a forwarding node between the control plane device and the RAN node, the SFE forwards a message between the control plane device and the RAN node, to complete the access process.

A specific process of step 706 is the same as that of step 606.

In this embodiment of the present application, when the RAN node receives the access request sent by the UE, if the control plane device in the source network of the UE is unreachable, the RAN node directly sends the access request to the SFE, and the SFE selects, for the UE, the control plane device (such as an MME) based on the usage type of the UE, and then sends the access request of the UE to the control plane device, to complete a subsequent access procedure. In the method, the SFE selects, for the UE, the control plane device based on the usage type of the UE, and then the UE accesses a network in which the control plane device is located, namely, the control plane device accessed by the UE is a control plane device in a network corresponding to the UE, and this ensures that the control plane device can complete security verification of the UE. In addition, in the method, an attach procedure or a TAU procedure is performed only one time, so that signaling interaction can be reduced, and a processing delay and processing load of the control plane device are reduced. In the method, a function of the control plane device does not need to be redesigned. In addition, interaction between networks is avoided, and this ensures mutual isolation between the networks.

Figure 9:
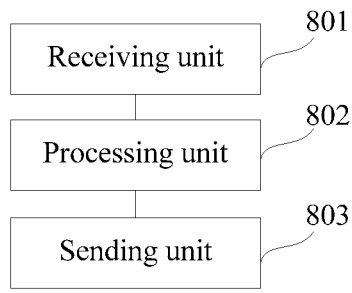
FIG. 9 is a schematic structural diagram of an access apparatus according to an embodiment of the present application.

FIG. 9 is a block diagram of an access apparatus according to an embodiment of the present application. The access apparatus may be implemented as all or a part of an SFE by using software, hardware, or a combination of software and hardware. The access apparatus may implement the steps performed by the SFE in the access method provided in any one of FIG. 3 or FIG. 5 to FIG. 8. The access apparatus may include a receiving unit 801 and a processing unit 802.

The receiving unit 801 is configured to receive an access request of user equipment UE sent by a radio access network node RAN node.

The processing unit 802 is configured to: determine a usage type of the UE based on the access request of the UE; and select, for the UE based on the usage type of the UE, a node that is in a dedicated core network and that can serve the UE, to send the access request to the node, where the node that is in the dedicated core network and that can serve the UE corresponds to the usage type of the UE.

In this embodiment of the present application, when receiving the access request of the UE, the SFE determines the usage type of the UE based on the access request of the UE, and selects, for the UE, the node in the corresponding dedicated core network based on the usage type of the UE, so as to send the access request to the node, and complete a subsequent access procedure. Therefore, a node accessed by the UE is the node in the dedicated core network corresponding to the UE, and this ensures that the node can complete security verification of the UE. In addition, in the method, an attach procedure or a TAU procedure is performed only one time, so that signaling interaction can be reduced, and a processing delay and processing load of the node are reduced. In the method, a function of the node does not need to be redesigned. In addition, interaction between dedicated core networks is avoided, and this ensures mutual isolation between the dedicated core networks.

The access request includes a non-access stratum NAS request message. The NAS request message is an attach request message or a tracking area update TAU request message.

In a possible implementation, the processing unit 802 is configured to:

directly obtain the usage type of the UE from the access request.

In another possible implementation, the processing unit 802 is configured to:

obtain an ID of the UE;

send a subscriber data request to an HSS, where the subscriber data request includes the ID of the UE, and the subscriber data request is used to request subscriber data of the UE;

receive subscriber data of the UE returned by the HSS, where the subscriber data of the UE includes the usage type of the UE; and obtain the usage type of the UE from the subscriber data of the UE.

Further, the processing unit 802 is configured to:

obtain the ID of the UE from the access request; or the processing unit 802 is configured to:

send an ID request to the UE, where the ID request is used to request the ID of the UE; and receive the ID of the UE returned by the UE; or the processing unit 802 is configured to:

obtain a temporary ID of the UE in the access request, where the temporary ID of the UE is allocated, to the UE, by a node in a source network in which the UE is located;

send a context request to the node in the source network, where the context request includes the temporary ID of the UE, and the context request is used to request a context of the UE; and receive the context of the UE returned by the node in the source network, and obtain the ID of the UE from the context of the UE.

In another possible implementation, the processing unit 802 is configured to:

obtain a temporary ID of the UE in the access request, where the temporary ID of the UE is allocated, to the UE, by a node in a source network in which the UE is located;

send a context request to the node in the source network, where the context request includes the temporary ID of the UE, and the context request is used to request a context of the UE; and receive the context of the UE returned by the node in the source network, and obtain the usage type of the UE from the context of the UE.

In a possible implementation, the apparatus further includes: a sending unit 803, configured to send a redirection message to the RAN node, where the redirection message includes information about the node that is in the corresponding dedicated core network and that is selected by the SFE for the UE, so that the RAN node sends the access request to the node in the dedicated core network corresponding to the UE.

In another possible implementation, the apparatus further includes: a sending unit 803, configured to directly send the access request to the node in the dedicated core network corresponding to the UE.

Further, the sending unit 803 is configured to:

establish an S1 connection to the node in the dedicated core network corresponding to the UE; and send, by using the S1 connection, the access request to the node in the dedicated core network corresponding to the UE.

Further, the sending unit 803 is further configured to forward, as a forwarding node between the RAN node and the node in the dedicated core network corresponding to the UE, a message between the RAN node and the node in the dedicated core network corresponding to the UE.

Further, the receiving unit 801 is further configured to receive a message sent by the node in the dedicated core network corresponding to the UE; and the sending unit 803 is configured to forward the message to the RAN node; or the receiving unit 801 is further configured to receive a message sent by the RAN node; and the sending unit 803 is configured to forward the message to the node in the dedicated core network corresponding to the UE.

Figure 10:
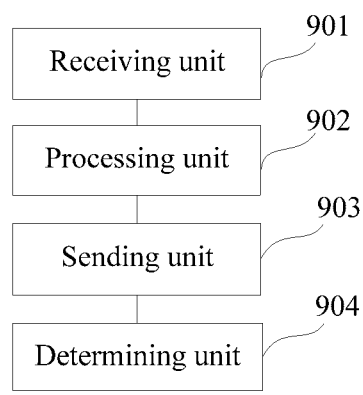
FIG. 10 is a schematic structural diagram of another access apparatus according to an embodiment of the present application.

FIG. 10 is a block diagram of an access apparatus according to an embodiment of the present application. The access apparatus may be implemented as all or a part of a RAN node by using software, hardware, or a combination of software and hardware. The access apparatus may implement the steps performed by the RAN node in the access method provided in any one of FIG. 4 to FIG. 8. The access apparatus may include: a receiving unit 901, a processing unit 902, and a sending unit 902.

The receiving unit 901 is configured to receive an access request sent by user equipment UE;

the processing unit 902 is configured to: when the access request does not include an identifier of a node in a source dedicated core network of the UE, or when an identifier of a node in a source dedicated core network that is carried in the access request is not in a preconfigured node identifier table, determine that the node in the source dedicated core network is unreachable; and the sending unit 903 is configured to send the access request to a selection function entity SFE.

Optionally, the receiving unit 901 is further configured to receive a node that is in a dedicated core network corresponding to the UE and that is determined by the selection function entity SFE, where the node in the dedicated core network corresponding to the UE is a node that is selected by the SFE for the UE based on a usage type of the UE, that is in a dedicated core network, and that can serve the UE; and the sending unit 903 is further configured to send the access request of the UE to the node in the dedicated core network corresponding to the UE.

In this embodiment of the present application, when receiving the access request sent by the UE, the RAN node determines, by using the selection function entity SFE, the node in the dedicated core network corresponding to the UE, and sends the access request of the UE to the node in the dedicated core network corresponding to the UE, to complete a subsequent access procedure. Therefore, a node accessed by the UE is the node in the dedicated core network corresponding to the UE, and this ensures that the node can complete security verification of the UE. In addition, in the method, an attach procedure or a TAU procedure is performed only one time, so that signaling interaction can be reduced, and a processing delay and processing load of the node are reduced. In the method, a function of the node does not need to be redesigned, so that costs are reduced. In addition, interaction between dedicated core networks is avoided, and this ensures mutual isolation between the dedicated core networks.

The receiving unit 901 is configured to:

when the identifier of the node in the source network of the UE can not be obtained or the node in the source network of the UE is unreachable, receive the node that is in the dedicated core network corresponding to the UE and that is determined by the selection function entity SFE.

The receiving unit 901 is configured to receive a redirection message returned by the SFE, where the redirection message includes information about the node in the dedicated core network corresponding to the UE.

The identifier of the node in the source network of the UE is a globally unique mobility management entity identifier GUMMEI or a packet temporary mobile subscriber identity P-TMSI.

The access request includes a non-access stratum NAS request message. The NAS request message is an attach request message or a tracking area update TAU request message.

The sending unit 903 is configured to:

send the access request to the SFE, to directly send, by using the SFE, the access request to the node in the dedicated core network corresponding to the UE.

Further, the sending unit 903 is configured to:

establish an S1-Application Protocol AP connection to the SFE; and send the access request to the SFE by using the S1-AP connection.

In this embodiment of the present application, the sending unit 903 is further configured to use the SFE as a forwarding node between the RAN node and the node in the dedicated core network corresponding to the UE, to send a message to the node in the dedicated core network corresponding to the UE; and the receiving unit 901 is further configured to use the SFE as a forwarding node between the RAN node and the node in the dedicated core network corresponding to the UE, to receive a message sent by the node in the dedicated core network corresponding to the UE.

In this embodiment of the present application, the receiving unit 901 is configured to:

receive the access request sent by the UE by using a Radio Resource Control RRC message.

Further, the apparatus further includes:

a determining unit 904, configured to: determine whether the RRC message carries the identifier of the node in the source network of the UE; and when the access request carries the identifier of the node in the source network of the UE, determine whether the node in the source network of the UE is reachable.

Figure 11:
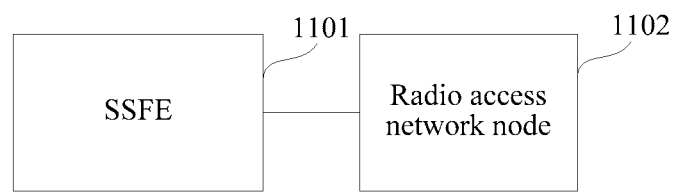
FIG. 11 is a schematic structural diagram of an access system according to an embodiment of the present application.

FIG. 11 is a block diagram of an access system according to an embodiment of the present application. Referring to FIG. 11, the system includes an SFE 1101 and a RAN node 1102.

The SFE 1101 is configured to: receive an access request of user equipment UE sent by a radio access network node RAN node; determine a usage type of the UE based on the access request of the UE; and select, for the UE based on the usage type of the UE, a node that is in a dedicated core network and that can serve the UE, where the node that is in the dedicated core network and that can serve the UE corresponds to the usage type of the UE.

The RAN node 1102 is configured to: receive the access request sent by the user equipment UE; when the access request does not include an identifier of a node in a source dedicated core network of the UE, or when an identifier of a node in a source dedicated core network that is carried in the access request is not in a preconfigured node identifier table, determine that the node in the source dedicated core network is unreachable; and send the access request to the selection function entity SFE.

The SFE 1101 may implement the steps performed by the SFE in the access method provided in any one of FIG. 3 or FIG. 5 to FIG. 8. The RAN node 1102 may implement the steps performed by the RAN node in the access method provided in any one of FIG. 4 to FIG. 8.

It should be noted that when the access apparatus provided in the foregoing embodiment performs UE accessing, division of the foregoing function units is only an example. In an actual application, the foregoing functions can be allocated to different function units for implementation as required, namely, an inner structure of the device is divided into different function units to implement all or some of the functions described above. In addition, the access apparatus provided in the foregoing embodiment and the access method embodiments are based on a same concept. For a specific implementation process, refer to the method embodiments and no further details are provided herein.

Persons of ordinary skill in the art may understand that all or some of the steps of the embodiments may be implemented by hardware or a program instructing related hardware. The program may be stored in a computer readable storage medium. The storage medium may include: a read-only memory, a magnetic disk, an optical disc, or the like.

The foregoing descriptions are only examples of embodiments of the present application, but are not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

What is claimed is:

1. An access method comprising:
receiving, by a selection function entity (SFE), a non-access stratum (NAS) request message from user equipment (UE) for requesting access, wherein the NAS request message comprises a usage type of the UE;
obtaining, by the SFE, the usage type of the UE from the NAS request message;
selecting, by the SFE based on the usage type of the UE, a service node in a network slice for the UE; and
directly sending the NAS request message to the service node.

2. The method according to claim 1, further comprises:
receiving, by the RAN node, the NAS request message from the UE; and
sending, by the RAN node, the NAS request message from the UE to the SFE.

3. The method according to claim 1, wherein the service node is available for providing a service associated with the usage type of the UE.

4. The method according to claim 1, wherein the usage type comprises: mobile broadband, machine type communication or inter-vehicle communication.

5. An access method comprising:
- receiving, by a selection function entity (SFE), a non-access stratum (NAS) request message from user equipment (UE) for requesting access via a radio access network node (RAN) node, wherein the NAS request message comprises a usage type of the UE;
- determining, by the SFE, the usage type of the UE based on the NAS request message of the UE; and
- selecting, by the SFE for the UE based on the usage type of the UE, a service node in a network slice and that can serve the UE, wherein the service node in the network slice is associated with the usage type of the UE;
- wherein determining the usage type of the UE based on the NAS request message of the UE comprises:
  - obtaining, by the SFE, an ID of the UE;
  - sending, by the SFE, a subscriber data request to a home subscriber server (HSS), wherein the subscriber data request comprises the ID of the UE;
  - receiving, by the SFE, subscriber data of the UE returned by the HSS, wherein the subscriber data of the UE comprises the usage type of the UE; and
  - obtaining, by the SFE, the usage type of the UE from he subscriber data of the UE;
- wherein obtaining the ID of the UE comprises:
  - (i) obtaining, by the SFE, the ID of the UE from the NAS request message; or
  - (ii) sending, by the SFE, an ID request to the UE, wherein the ID request is used to request the ID of the UE; and
    receiving the ID of the UE returned by the UE; or
  - (iii) obtaining, by the SFE, a temporary ID of the UE in the NAS request message, wherein the temporary ID of the UE is allocated, to the UE, by a node in a source network slice in which the UE is located;
    sending, by the SFE, a context request to the service node in the source network slice, wherein the context request comprises the temporary ID of the UE, and wherein the context request is used to request a context of the UE;
    receiving, by the SFE, the context of the UE returned by the service node in the source network slice; and
    obtaining, by the SFE, the ID of the UE from the context of the UE.

6. The method according to claim 5, wherein after selecting, for the UE based on the usage type of the UE, the service node in the network slice and that can serve the UE, the method further comprises:
- sending, by the SFE, a redirection message to the RAN node, wherein the redirection message comprises information about the service node in the network slice associated with the usage type of the UE and that is selected by the SFE for the UE, so that the RAN node sends the NAS request message to the service node in the network slice associated with the usage type of the UE.

7. The method according to claim 5, wherein after selecting, for the UE based on the usage type of the UE, the service node in the network slice and that can serve the UE, the method further comprises:
- directly sending, by the SFE, the NAS request message to the service node in the network slice associated with the usage type of the UE.

8. The method according to claim 5, further comprising:
- receiving, by the RAN node, a radio resource control (RRC) message for requesting access from the UE; and
- sending, by the RAN node, the NAS request message to the SFE.

9. An apparatus comprising:
- a processor;
- a receiver in communication with the processor;
- a sender in communication with the processor; and
- the processor is configured to provide at least the following operations:
  - receiving, via the receiver, a non-access stratum (NAS) request message from user equipment (UE) for requesting access, wherein the NAS request message comprises a usage type of the UE;
  - obtaining the usage type of the UE from the NAS request message;
  - selecting, for the UE based on the usage type of the UE, a service node in a network slice; and
  - directly sending, using the sender, the NAS request message to the service node.

10. The apparatus according to claim 9, wherein the service node is available for providing a service associated with the usage type of the UE.

11. The apparatus according to claim 9, wherein the usage type comprises mobile broadband, machine type communication or inter-vehicle communication.

12. An apparatus comprising:
- a processor;
- a receiver configured to cooperate with the processor to receive a non-access stratum (NAS) request message from user equipment (UE) for requesting access via a radio access network node RAN node, wherein the NAS request message comprises a usage type of the UE; and
- the processor is configured to:
  - determine the usage type of the UE based on the quest message of the UE; and
  - select, for the UE based on the usage type of the UE, a service node that is in a network slice and that can serve the UE, wherein the service node that is in the network slice and that can serve the UE is associated with the usage type of the UE,
  - wherein in determining the usage type of the UE based on the NAS request message of the UE, the processor is further configured to obtain an ID of the UE;
  - send a subscriber data request to an wherein the subscriber data request comprises the ID of the UE, and wherein the subscriber data request is used to request subscriber data of the UE;
  - receive the subscriber data of the UE returned by the ENS; and
  - obtain the usage type of the UE from the subscriber data of the UE;
    - wherein in obtaining the ID of the UE, the processor is further configured to:
      - (i) obtain the ID of the UE from the NAS request message; or
      - send an ID request to the UE, wherein the ID request is used to request the ID of the UE; and receive the ID of the UE returned by the UE; or
      - (iii) obtain a temporary ID of the UE in the NAS request message, wherein the temporary ID of the UE is allocated, to the UE, by a node in a source network slice in which the UE is located;
        send a context request to the service node in the source network slice, wherein the context request comprises the temporary ID of the UE, and the context request is used to request a context of the UE;

receive the context of the UE returned by the service node in the source network slice; and obtain the ID of the UE from the context of the UE.

13. The apparatus according to claim 12, wherein the apparatus further comprises:

a sender configured to cooperate with the processor to send a redirection message to the RAN node, wherein the redirection message comprises information about the service node in the network slice associated with the usage type of the UE and that is selected by the SFE for the UE, so that the RAN node sends the NAS request message to the service node in the network slice associated with the usage type of the UE.

14. The apparatus according to claim 12, wherein the apparatus further comprises:

a sender configured to cooperate with the processor to directly send the NAS request message to the service node in the network slice associated with the usage type of the UE.

15. A system comprising:

a radio access network (RAN) node configured to:
receive, from user equipment (UE), a non-access stratum (NAS) request message for requesting access; and
send the NAS request message, from the UE. to a selection function entity (SFE), wherein the NAS request message comprises a usage type of the UE; and the SFE is configured to:
receive the NAS request message from the RAN node;
obtain the usage type of the UE from the NAS request message;
select, based on the usage type of the UE, a service node in a network slice for the UE; and
directly send the NAS request message to the service node.

16. The system according to claim 15, wherein the service node is available for providing a service associated with the usage type of the UE.

17. The system according to claim 15, wherein the usage type comprises mobile broadband, machine type communication or inter-vehicle communication.

* * * * *

UNITED STATES PATENT AND TRADEMARK OFFICE
CERTIFICATE OF CORRECTION

PATENT NO. : 10,863,555 B2
APPLICATION NO. : 16/148665
DATED : December 8, 2020
INVENTOR(S) : Wang et al.

Page 1 of 1

It is certified that error appears in the above-identified patent and that said Letters Patent is hereby corrected as shown below:

In the Claims

Claim 5: Column 25, Line 23: "he subscriber data of the UE;" should read -- the subscriber data of the UE; --.

Claim 12: Column 26, Line 34: "determine the usage type of the UE based on the quest" should read -- determine the usage type of the UE based on the NAS request --.

Claim 12: Column 26, Line 49: "ENS; and" should read -- HSS; and --.

Claim 12: Column 26, Line 56: "send an ID request to the UE, wherein the ID" should read -- (ii) send an ID request to the UE, wherein the ID --.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*